United States Patent
Imahara et al.

(10) Patent No.: US 8,838,283 B2
(45) Date of Patent: Sep. 16, 2014

(54) DR COUNTERMEASURE PROPOSAL DEVICE AND METHOD THEREOF

(75) Inventors: Shuichiro Imahara, Kawasaki (JP); Kazuto Kubota, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/421,015

(22) Filed: Mar. 15, 2012

(65) Prior Publication Data

US 2012/0330477 A1 Dec. 27, 2012

(30) Foreign Application Priority Data

Jun. 24, 2011 (JP) ................................ 2011-140878
Feb. 21, 2012 (JP) ................................ 2012-035410

(51) Int. Cl.
*G06F 1/26* (2006.01)
*H02J 13/00* (2006.01)
*G06Q 50/06* (2012.01)
*H02J 3/14* (2006.01)

(52) U.S. Cl.
CPC ............ *H02J 3/14* (2013.01); *H02J 2003/143* (2013.01); *H02J 13/0006* (2013.01); *G06Q 50/06* (2013.01)
USPC ............................................ 700/295; 307/38

(58) Field of Classification Search
None
See application file for complete search history.

(56) References Cited

U.S. PATENT DOCUMENTS

| | | | |
|---|---|---|---|
| 7,218,998 B1 * | 5/2007 | Neale ............................. | 700/295 |
| 8,410,633 B2 * | 4/2013 | Batzler et al. .................. | 307/41 |
| 2003/0011486 A1 * | 1/2003 | Ying ........................ | 340/825.69 |
| 2010/0010683 A1 * | 1/2010 | Kates ............................. | 700/293 |
| 2011/0087382 A1 * | 4/2011 | Santacatterina et al. ...... | 700/291 |
| 2011/0251731 A1 * | 10/2011 | Yang et al. .................... | 700/296 |
| 2011/0298286 A1 * | 12/2011 | Batzler et al. .................. | 307/41 |

FOREIGN PATENT DOCUMENTS

| JP | 2009-290967 | 12/2009 |
| JP | 2010-75015 | 4/2010 |
| JP | 2011-234558 | 11/2011 |

OTHER PUBLICATIONS

Machine Translation of JP2011-234558.*
Machine Translation of JP2010-075015.*
Japanese Office Action issued May 8, 2012, in Patent Application No. 2012-035410 (with English-language translation).

* cited by examiner

*Primary Examiner* — Ryan Jarrett
(74) *Attorney, Agent, or Firm* — Oblon, Spivak, McClelland, Maier & Neustadt, L.L.P.

(57) ABSTRACT

There is provided a DR (Demand Response) countermeasure proposal device in which the communication unit receives a power consumption reduction, the rule database stores instrument control rules related to instruments, the rule ranking history database stores information on a ranking of the instrument control rules, the display displays the instrument control rules according to the ranking, the rule ranking changing unit changes the ranking of the instrument control rules in response to an instruction input from the customer, the DR execution unit selects at least one instrument control rule by execution of which the power consumption reduction request is satisfied in descending order of the ranking of the instrument control rules, and executes the at least one instrument control rule to control operation of at least one instruments related thereto.

13 Claims, 20 Drawing Sheets

EXAMPLE OF RULE DB
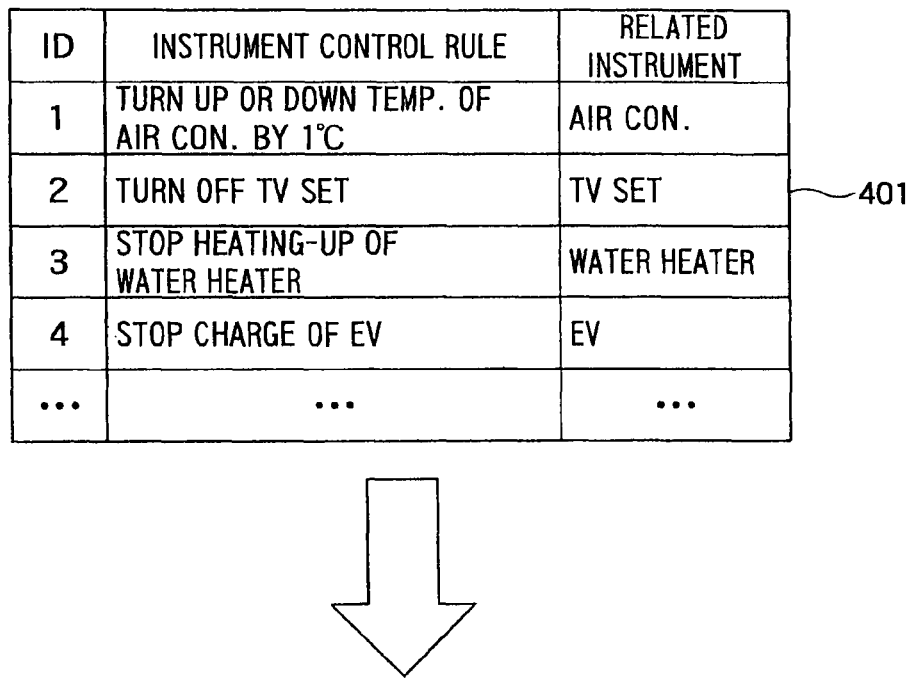
EXAMPLE OF RELATED RULE (IN THE CASE THAT AIR CONDITIONER, TV SET, AND EV ARE EV BEING UTILIZED)
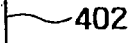
FIG. 4

1701

EXAMPLE OF RANKED RELATED RULE

| ID | INSTRUMENT CONTROL RULE | RELATED INSTRUMENT | RANKING |
|---|---|---|---|
| 1 | TURN UP OR TURN DOWN TEMP. OF AIR CON. BY 1°C | AIR CON. | 3 |
| 2 | TURN off TV SET | TV SET | 2 |
| 4 | STOP CHARGE OF EV | EV | 1 |
| ... | ... | ... | ... |

DR COUNTERMEASURE PROPOSAL DEVICE AND METHOD THEREOF

CROSS REFERENCE TO RELATED APPLICATIONS

This application is based upon and claims the benefit of priority from the prior Japanese Patent Application Nos. 2011-140878 and 2012-35410, filed on Jun. 24, 2011 and Feb. 21, 2012, respectively, the entire contents of which are incorporated herein by reference.

FIELD

An embodiment relates to a Demand Response (DR) countermeasure proposal device that proposes controlling of an instrument in a house in a DR system that makes a request to a customer to reduce power consumption, and a method thereof.

BACKGROUND

Automation of Demand Response (DR) that makes a power consumption reduction request to a customer in a tightened electric power situation is being developed by a standardization committee such as OASIS (OpenADR) and ZigBee. The Demand Response that is conventionally aimed at a major customer is expanding to a general customer.

In the related art, it is necessary to manually register a minimum reduction power in DR execution and an instrument control rule at that time prior to the DR execution. A method for automating the registration work is proposed.

In the proposed method for automating the registration work, an instrument usage situation by a customer is accumulated, and in the case that the situation drops off from the normal usage situation (in the case that power consumption is larger than usual), the situation is corrected to a normal usage situation. However, a method for reducing the power more than that of the normal usage situation is not proposed.

BRIEF DESCRIPTION OF THE DRAWINGS

FIG. 4 illustrates an example of a rule DB and an example of a related rule;

DETAILED DESCRIPTION

There is provided a DR (Demand Response) countermeasure proposal device including: a communication unit, a rule database, a rule ranking history database, a display, a rule ranking changing unit, a rule ranking history update unit, and a DR execution unit.

The communication unit receives a power consumption reduction request indicating power consumption to be reduced or to be targeted from a DR (Demand Response) server.

The rule database stores a plurality of instrument control rules related to a plurality of instruments in a house of a customer.

The rule ranking history database stores information on a ranking of the instrument control rules.

The display displays the instrument control rules in the rule database according to the ranking of the instrument control rules.

The rule ranking history update unit changes the ranking of the instrument control rules in response to an instruction input from the customer.

The DR execution unit selects at least one instrument control rule by execution of which the power consumption reduction request is satisfied in descending order of the ranking of the instrument control rules, and executes the at least one instrument control rule to control operation of at least one instrument related to the at least one instrument control rule.

Hereafter, device and method for DR countermeasure proposal according to the present embodiment will be described more specifically with reference to the drawings.

Figure 1:
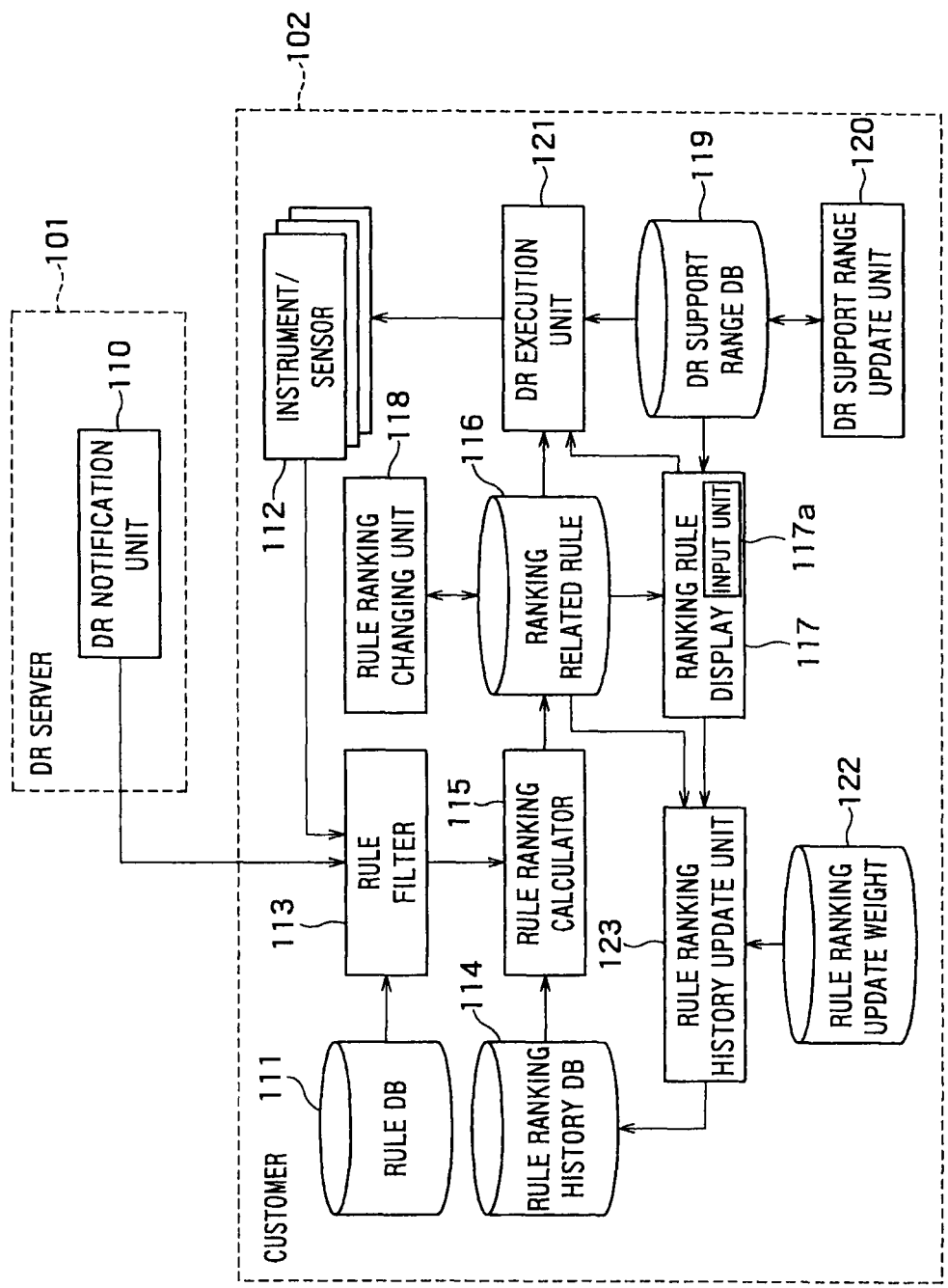
FIG. 1 illustrates a Demand Response (DR) countermeasure proposal device according to a first embodiment.

FIG. 1 illustrates a Demand Response (DR) countermeasure proposal device according to a first embodiment.

A DR countermeasure proposal device 102 is placed in a house of a customer, and the DR countermeasure proposal device 102 can conduct communication with a DR notification unit 110 in a DR server 101.

The DR countermeasure proposal device 102 includes a rule database (DB) 111, an instrument/sensor 112, a rule filter 113, a rule ranking history DB 114, a rule ranking calculator 115, a ranked related rule 116, a ranked rule display 117, a rule ranking changing unit 118, a DR support range DB 119, a DR support range update unit 120, a DR execution unit 121, a rule ranking update weight 122, and a rule ranking history update unit 123.

The DR notification unit 110 transmits a DR signal to the DB countermeasure proposal device 102 when making a DR execution request. The transmitted DR signal is received by a communication unit of the DB countermeasure proposal device 102 and transferred to the rule filter 113.

There are various DR signals such as the existence or non-existence of execution, an execution level, a reduction amount, and cost information. In the first embodiment, one of electric power target reduction amounts that are previously set by a customer is transmitted as the DR signal according to a demand and supply state. Instead of the reduction amount, target power consumption may be included in the DR signal. In this case, target reduction amount is obtained by subtracting the target power consumption from the power consumption measured at a house of the customer. Therefore, the DR countermeasure proposal device 102 may include a function of calculating the target reduction amount and a function of measuring the power consumption of an instrument in the house.

The rule DB 111 accumulates instrument control rules efficient to reduce the power consumption. The instrument control rules are used in the rule filter 113. FIG. 4 illustrates an example 401 of the rule DB 111. The instrument control rules are correlated with corresponding instruments that become the targets of the rules in the DB 11. The instrument control rules are also correlated with power consumption that is reduced by executing the rules. A value of the power consumption may be stored in either the rule DB 111 or another database. In an example in FIG. 8, the power consumption of 300 W can be reduced by a rule "stop charge of EV".

The instrument/sensor 112 is an instrument in a house, such as a household electrical appliance, a household equipment instrument/sensor (such as a sensor to detect a person and a thermo-hygrometer). An operating state of the instrument/sensor 112 is used in the rule filter 113. The instrument/sensor 112 controls itself in response to an instrument control command issued by the DR execution unit 121.

The rule filter 113 is operated with a DR notification from the DR notification unit 110 as a trigger. The rule filter 113 extracts the instrument control rules (related rules) related to the operating instrument/sensor from the instrument control rules accumulated in the rule DB 111. The extracted related rules are used in the rule ranking calculator 115. FIG. 4 illustrates an example 402 of the related rules extracted from the example 401 of the rule DB.

Figure 6:
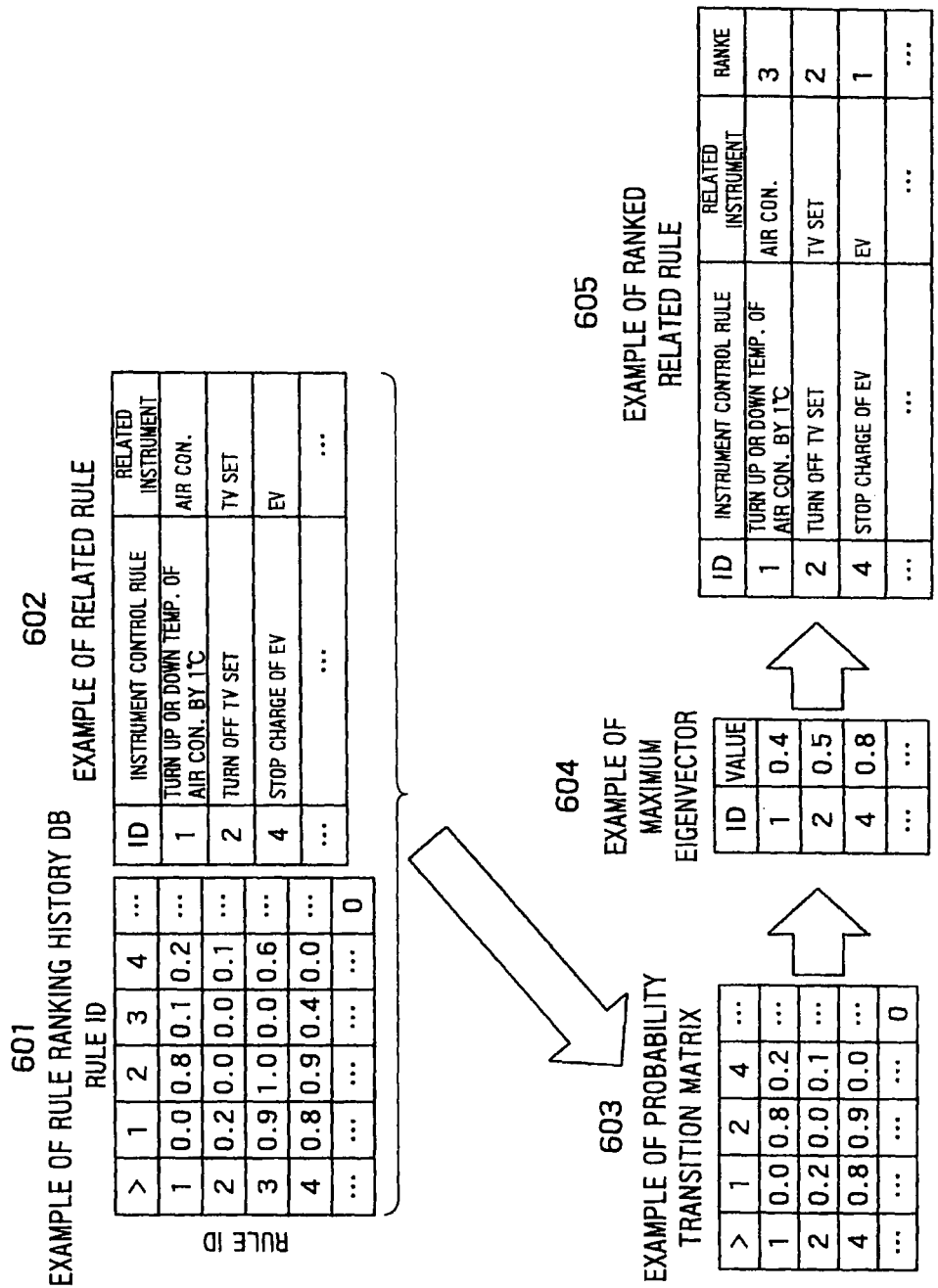
FIG. 6 illustrates an example of a rule ranking history DB, an example of a probability transition matrix, and an example of a ranked related rule.

The rule ranking history DB 114 accumulates a probability (ranking probability) indicating which rule is easily selected by the customer in each instrument control rule pair. The ranking probability is used in the rule ranking calculator 115. FIG. 6 illustrates an example 601 of the rule ranking history DB 114. In the example 601, the probability that a ranking of rule 1 (vertical line) is higher than a ranking of rule 2 (horizontal line) is 80 percent.

The rule ranking calculator 115 extracts only the ranking probabilities, which are related to the related rules output by the rule filter 113, from the rule ranking history DB 114 to construct a probability transition matrix. The probability transition matrix expresses the ranking of the two related rules. FIG. 6 illustrates an example 603 of the probability transition matrix.

The rule ranking calculator 115 calculates a maximum eigenvector of the probability transition matrix. FIG. 6 illustrates an example 604 of the maximum eigenvector. The ranking of the related rules are calculated according to values of elements of the maximum eigenvector. The related rule rises in rank with increasing value.

The rule ranking calculator 115 correlates the calculated ranking with the related rules to thereby obtain the ranked related rules 116. The ranked related rules 116 are used in the ranked rule display 117 and the rule ranking changing unit 118. FIG. 6 illustrates an example 605 of the ranked related rules 116.

Figure 8:
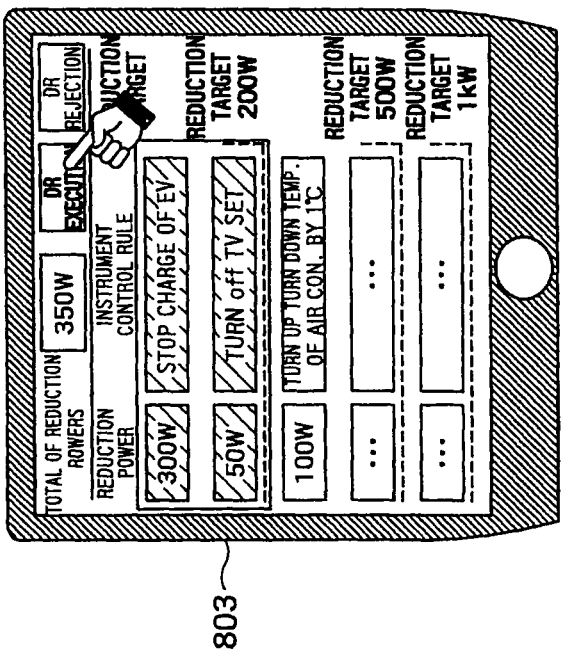
FIG. 8 illustrates an example of DR support range DB.

A range of the instrument control rules that are executed in response to the DR notification is stored in the DR support range DB 119. Specifically, the range corresponding to a content of the DR notification is stored in the DR support range DB 119. The range is used in the ranked rule display 117, the DR support range update unit 120, and the DR execution unit 121. FIG. 8 illustrates an example 802 of the DR support range DB 119. In the case of the reduction target of 200 W, the instrument control rules ID4 and ID2 are assigned as the execution range.

The ranked rule display 117 displayed the ranked related rule 116 and a DR support range corresponding to the content of the DR notification on a terminal screen. The instrument control rule is displayed on an upper side of the screen with increasing ranking. Therefore, in the case that many instrument control rules exist, the customer can recognize the instrument control rule having a higher execution priority without a trouble of searching the instrument control rule.

The ranked rule display 117 includes an input unit 117a, such as a touch panel, which receives an input of the customer. The input unit 117a receives a change of the instrument control rule ranking and a change of the range of the instrument control rules that are executed in response to the DR notification from the customer.

In the case that the customer inputs the change of the instrument control rule ranking, the rule ranking changing unit 118 executes changing processing. In the case that the customer inputs the change of the range of the instrument control rules to be executed, the DR support range update unit 120 executes changing processing.

The rule ranking changing unit 118 corrects the ranked related rules 116 according to a sequence assigned by the customer in the case that the customer issues an instruction to change the sequence of the instrument control rules through the ranked rule display 117.

The DR support range update unit 120 corrects the DR support range DB 119 according to the DR support range assigned by the customer in the case that the customer issues an instruction to change the range of the instrument control rules through the ranked rule display 117.

The DR execution unit 121 executes processing in the case that the customer selects DR execution by accepting the rule ranking and DR range that are displayed on the ranked rule display 117. Specifically, a control command is transmitted to the target instrument according to the instrument control rule included in the DR range (the post-change DR range in the case that the DR range is changed, and the original DR range in the case that the DR range is not changed). On the other hand, in the case that the customer selects DR rejection by deciding that the DR is not performed on this occasion, the processing is ended to wait for the new DR notification.

The DR execution unit 121 specifies the instrument control rules corresponding to the target reduction amount of the DR signal based on the DR support range DB 119, and controls the instrument/sensor 112 according to the specified instrument control rules. At this point, the control may be executed from the instrument having the higher ranking of the instrument control rule.

Based on the ranked related rules 116, the rule ranking history update unit 123 updates the rule ranking history DB 114 according to the rule ranking update weight 122.

The rule ranking update weight 122 expresses how much the ranked related rule 116 newly selected on the ranked rule display 117 by the customer is emphasized. The rule ranking update weight 122 is previously set by the customer. In the rule ranking update weight 122, a different value may be set in each rule pair, or a common value may be set in all the rule pairs. The detailed processing in which the weight is used is described later.

Figure 16:
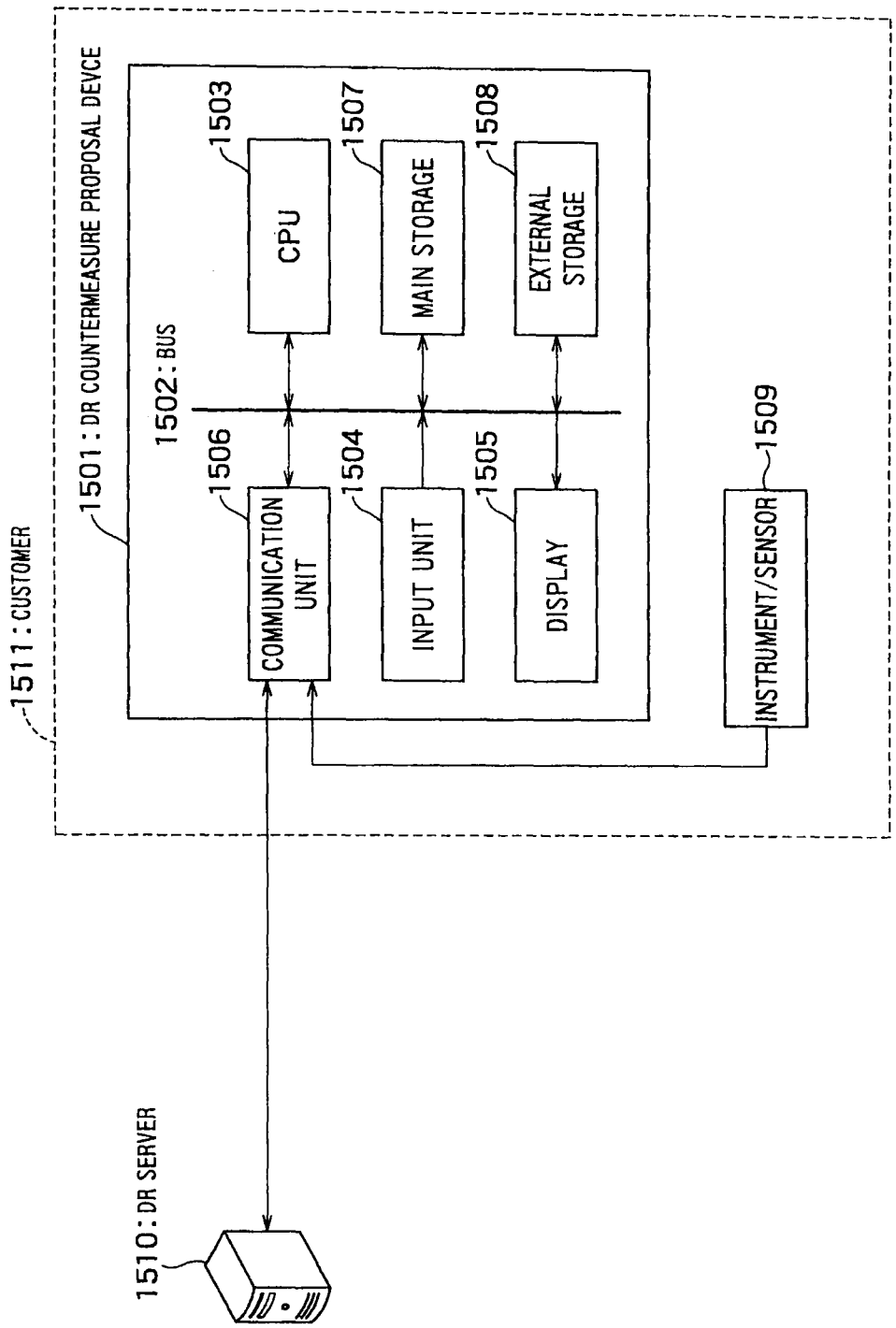
FIG. 16 illustrates an example of a hardware configuration of the DR countermeasure proposal device.

FIG. 16 illustrates a hardware configuration example of the DR countermeasure proposal device.

A DR countermeasure proposal device 1501 can be constructed by using a built-in computer as basic hardware. Referring to FIG. 16, the built-in computer includes a CPU 1503, an input unit 1504, a display 1505, a communication unit 1506, a main storage 1507, and an external storage 1508, and the units are connected to one another through a bus 1502 so as to be able to conduct communication with one another.

The input unit 1504 includes an input device such as a keyboard and a mouse, and outputs a manipulation signal generated by a manipulation of the input device to the CPU 1503.

For example, the display 1505 is constructed by an LCD (Liquid Crystal Display) or a CRT (Cathode Ray Tube).

The communication unit 1506 includes communication means such as Ethernet (registered trademark), a wireless LAN (Local Area Network), Bluetooth (registered trademark), and ZigBee (registered trademark) to conduct communication with the instrument/sensor 1509 and the DR server 1510.

The external storage 1508 is constructed by a hard disk or a storage medium such as a CD-R, a CD-RW, a DVD-RAM, and a DVD-R. A control program, which causes the CPU 203 to execute the pieces of processing of the rule filter 113, rule ranking calculator 115, ranked rule display 117, rule ranking changing unit 118, DR support range update unit 120, DR execution unit 121, and rule ranking history update unit 123, is stored in the external storage 1508.

The rule DB 111, the rule ranking history DB 114, the ranked related rule 116, the DR support range DB 119, and the rule ranking update weight 122 are stored as data in the external storage 1508.

For example, the main storage 1507 is constructed by a memory. Under the control of the CPU 1503, the control program stored in the external storage 1508 is extended in the main storage 1507, and data necessary to execute the control program and data generated by executing the control program are stored in the main storage 1507. The control program may be implemented by previously installing the control program in the computer. Alternatively, the control program is stored in the storage medium such as the CD-ROM or the control program is distributed through a network, and the control program may be implemented by properly installing the control program in the computer.

Figure 2:
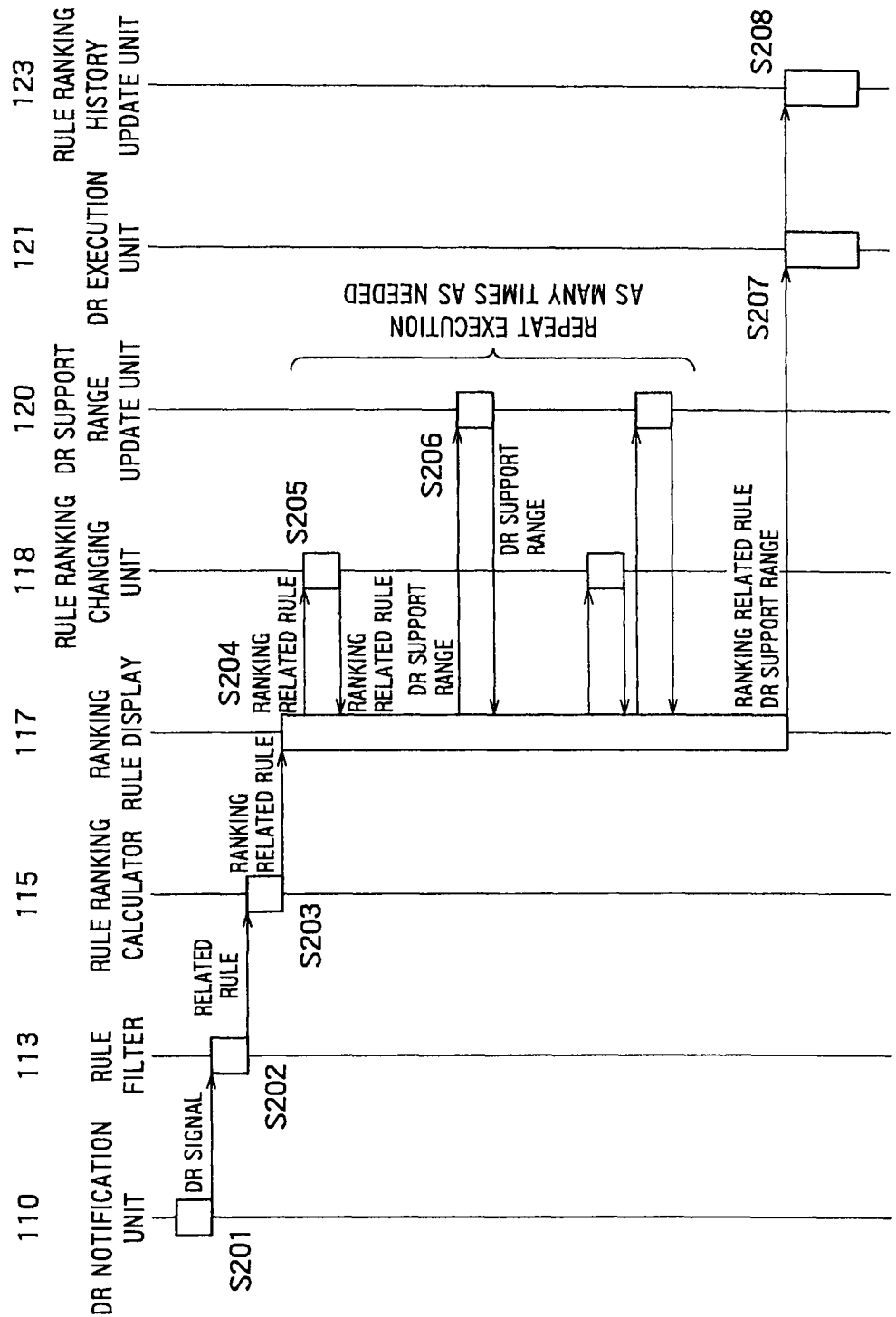
FIG. 2 illustrates an example of a communication procedure when units in the DR countermeasure proposal device are operated in conjunction with one another.

FIG. 2 illustrates an example of a communication procedure when the DR notification unit 201, the rule filter 202, the rule ranking calculator 203, the ranked rule display 204, the rule ranking changing unit 205, the DR support range update unit 206, the DR execution unit 207, and the rule ranking history update unit 208 in the DR countermeasure proposal device are operated in conjunction with one another.

In Step S201, DR countermeasure proposal processing is started in the tightened electric power situation, and the DR notification unit 110 of the DR server 101 transmits the DR signal to the rule filter 113 of the DR countermeasure proposal device.

In Step S202, the rule filter 113 extracts the related rules from the rule DB 111 based on the operating state of the instrument/sensor 112, and transmits the related rules to the rule ranking calculator 115.

In Step S203, the rule ranking calculator 115 ranks the related rules based on the rule ranking history DB 114, and transmits the ranked related rules to the ranked rule display 117.

In Step S204, the ranked rule display 117 displays the ranked related rules and the corresponding DR support range, which is stored in the DR support range DB 119, on the screen. The ranked rule display 117 becomes an input waiting state.

At this point, when the customer changes the rule ranking and the DR support range, the ranked related rules and the DR support range are transmitted to the rule ranking changing unit 118 and the DR support range update unit 120 to execute Steps S205 and S206, respectively. Steps S205 and S206 are repeated as needed basis.

When the customer selects the DR execution on the screen, the ranked related rules and the DR support range are transmitted to the DR execution unit 121, and the ranked related rules are transmitted to the rule ranking history update unit 123 (Steps S207 and S208). When the customer selects the DR rejection, the DR countermeasure proposal processing is ended.

In Steps S205 and S206, the rule ranking and DR support range that are changed by the customer are displayed on the ranked rule display 117.

In Step S207, the DR execution unit 121 executes the instrument control. After the rule ranking history update unit 123 executes the history update in Step S208, the DR countermeasure proposal processing is ended.

Therefore, the DR countermeasure proposal processing of the DR countermeasure proposal device is completed.

Figure 3:
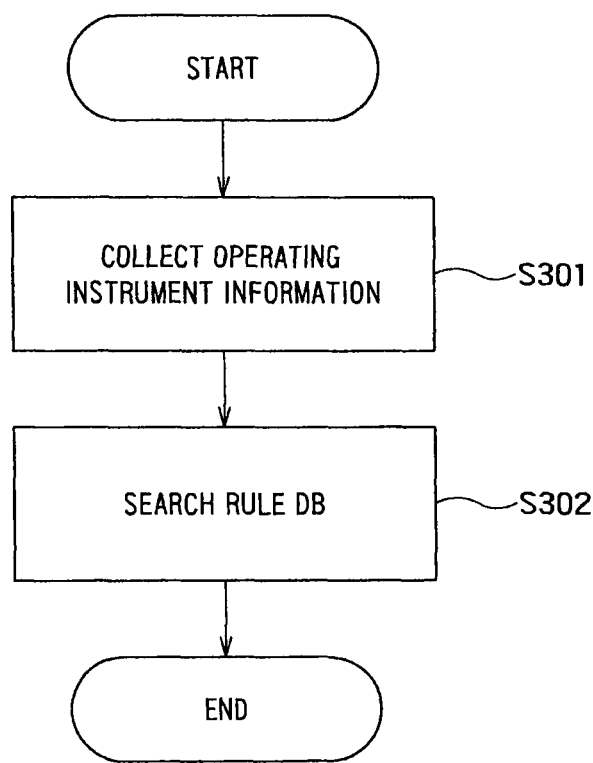
FIG. 3 illustrates an example of a processing procedure of a rule filter in FIG. 1.

FIG. 3 illustrates an example of a processing procedure of the rule filter 113 in FIG. 1.

When Step S202 in FIG. 2 is executed, Step S301 in FIG. 3 is executed. In Step S301, the operating state is acquired from the instrument/sensor 112 in FIG. 1. In Step S302, the instrument control rules related to the operating instruments are extracted from the rule DB 111 in FIG. 1. In the example in FIG. 4, the related rules 402 are obtained by extracting only the rules related to the operating air conditioner, TV set, and EV from the rules 401 in the rule DB 111.

Figure 5:
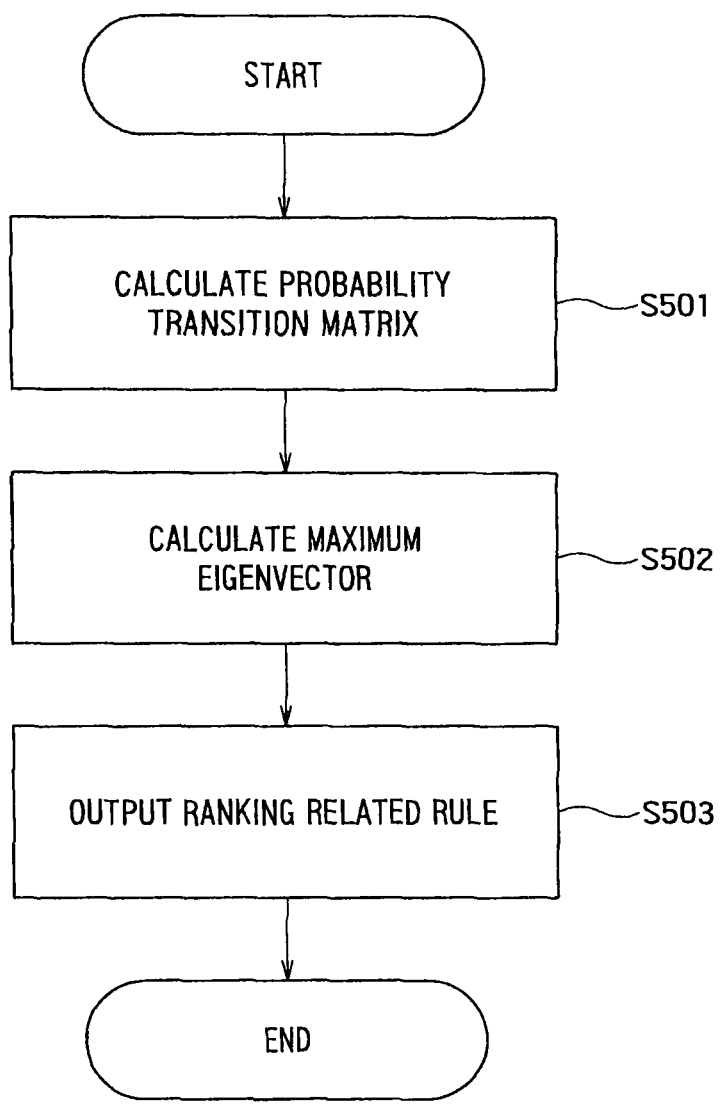
FIG. 5 illustrates an example of a processing procedure of a rule ranking calculator in FIG. 1.

FIG. 5 illustrates an example of a processing procedure of the rule ranking calculator 115 in FIG. 1.

When Step S203 in FIG. 2 is executed, Step S501 in FIG. 5 is executed. In Step S501, the ranking probabilities related to the related rules output by the rule filter 113 in FIG. 1 are extracted from the rule ranking history DB 114 in FIG. 1 to construct the probability transition matrix expressing the ranking between the two related rules. In the example 601 in FIG. 6, a probability transition matrix 603 is constructed only by the ranking probabilities corresponding to instrument control rules 1, 2, 4, . . . included in the related rule 602.

In Step S502, the maximum eigenvector of the probability transition matrix is calculated (see an example 604 in FIG. 6). The maximum eigenvector can be calculated by an LR method and a QR method.

In Step S503, the related rules are ranked in the descending order of the elements of the maximum eigenvector to obtain the ranked related rules 116 in FIG. 1 (see an example 605 in FIG. 6).

Figure 7:
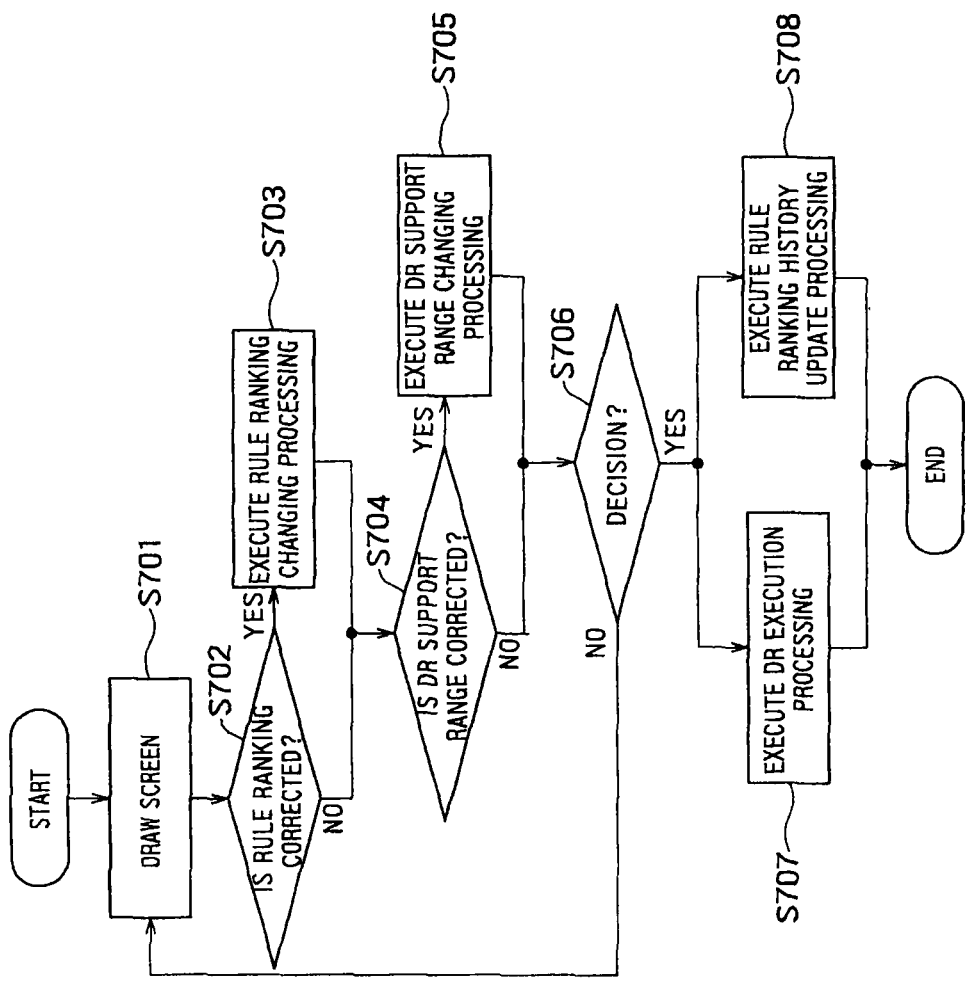
FIG. 7 illustrates an example of a processing procedure of a ranked rule display in FIG. 1.

FIG. 7 illustrates an example of a processing procedure of the ranked rule display 117 in FIG. 1.

When Step S204 in FIG. 2 is executed, Step S701 in FIG. 7 is executed. In Step S701, the ranked related rules 116 in FIG. 1 and the content of the DR support range DB 119 are displayed on the terminal screen.

FIG. 8 illustrates a display example 803. In FIG. 8, the example 803 expresses the cases of an example 801 (stop charge of EV, turn off TV set, turn up or turn down temperature of air conditioner by 1° C., ...) of the ranked related rules and an example 802 (including the instrument control rule of stop charge of EV and turn off TV set in the target of 200 W, and the instrument control rule of turn up or turn down temperature of air conditioner by 1° C. In the target of 500 W) of the DB 119. The DR notification "reduction target of 200 W" is highlighted with bold characters.

In Step S702, when the customer issues an instruction to change the sequence by dragging and replacing the instrument control rule, the flow goes to Step S703. If not, the flow goes to Step S704.

Figure 9A:
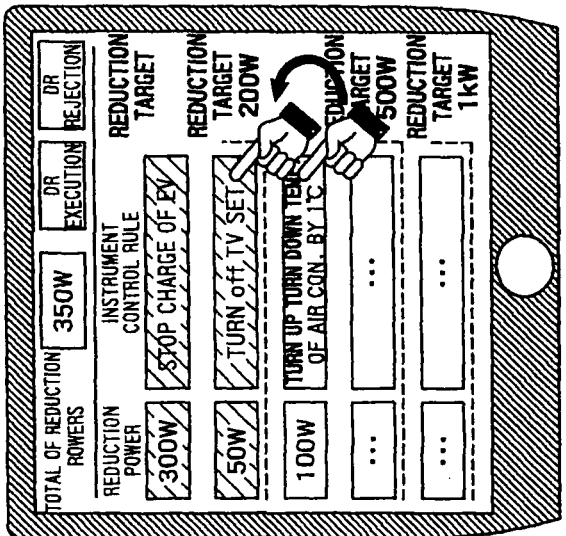
FIG. 9A illustrates an example in which a customer replaces instrument control rules of a TV set and an air conditioner with each other on a screen.
Figure 9B:
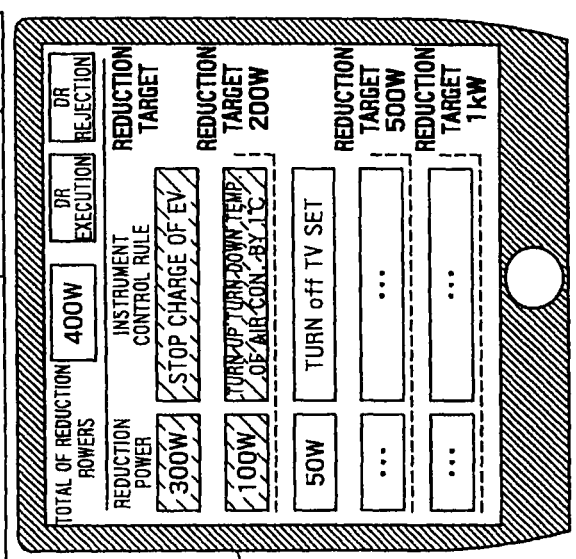
FIG. 9B illustrates an example of the screen after the replacement in FIG. 9A.

In Step S703, the rule ranking changing unit 118 in FIG. 1 executes the processing. A screen 906 in FIG. 9B illustrates the case that the customer replaces the instrument control rules of turn off TV set and turn up or turn down temperature of air conditioner by 1° C. with each other on a screen 903 in FIG. 9A. Examples 901 and 901 in FIG. 9A illustrate the ranked related rules and the DR support range before the replacement. As illustrated in examples 904 and 905 in FIG. 9B, the ranking of the ranked related rules and the instrument control IDs of the DR support ranges DB are replaced, respectively.

In Step S704, when the customer issues an instruction to change the execution range by dragging and displacing the characters of the reduction target expressing the DR support range, the flow goes to Step S705. If not, the flow goes to Step S706. In Step S705, the DR support range update unit 120 in FIG. 1 executes the processing.

Figure 10A:
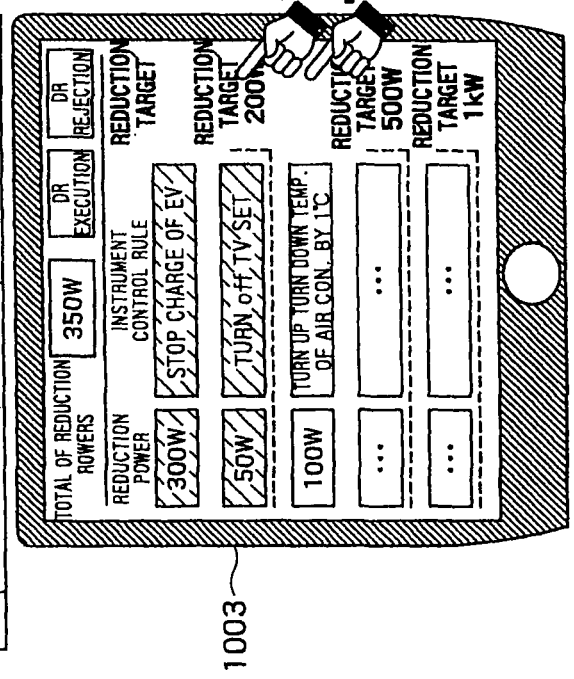
FIG. 10A illustrates an example in which the customer includes the instrument control rule of the air conditioner in an execution range on the screen.
Figure 10B:
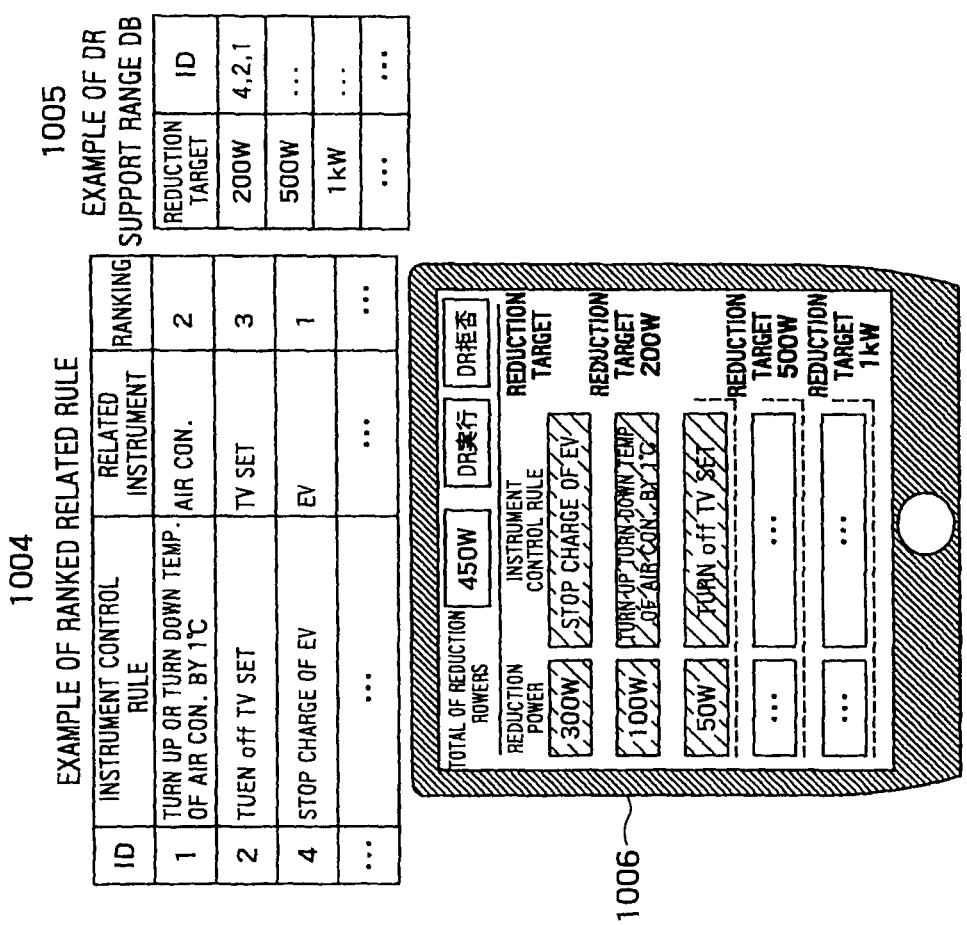
FIG. 10B illustrates an example of the screen after the change in FIG. 10A.

A screen 1003 in FIG. 10A illustrates the case that the customer changes the execution range such that turn up or turn down temperature of air conditioner by 1° C. is included in the execution range of the reduction target of 200 W. FIG. 10B illustrates a screen 1006 after the change. Examples 1001 and 1002 in FIG. 10A illustrate the ranked related rules and the DR support range before the change. As illustrated in examples 1004 and 1005 in FIG. 10B, the instrument control ID of the DR support range DB is changed (ID 1 is added). The ranked related rule 1005 is identical to the pre-change ranked related rule 1002 in FIG. 10A.

In Step S706, when the customer executes the DR by accepting the ranking of the instrument control rules and the DR support range, which are displayed on the screen, the flow goes to Steps S707 and S708. If not, the flow goes to Step S701. At this point, irrespective of the instruction from the customer, the flow may go to Steps S707 and S708 after a given time elapses. When the customer presses DR rejection on the screen, the DR countermeasure proposal processing is ended to wait for the new DR notification.

Figure 11:
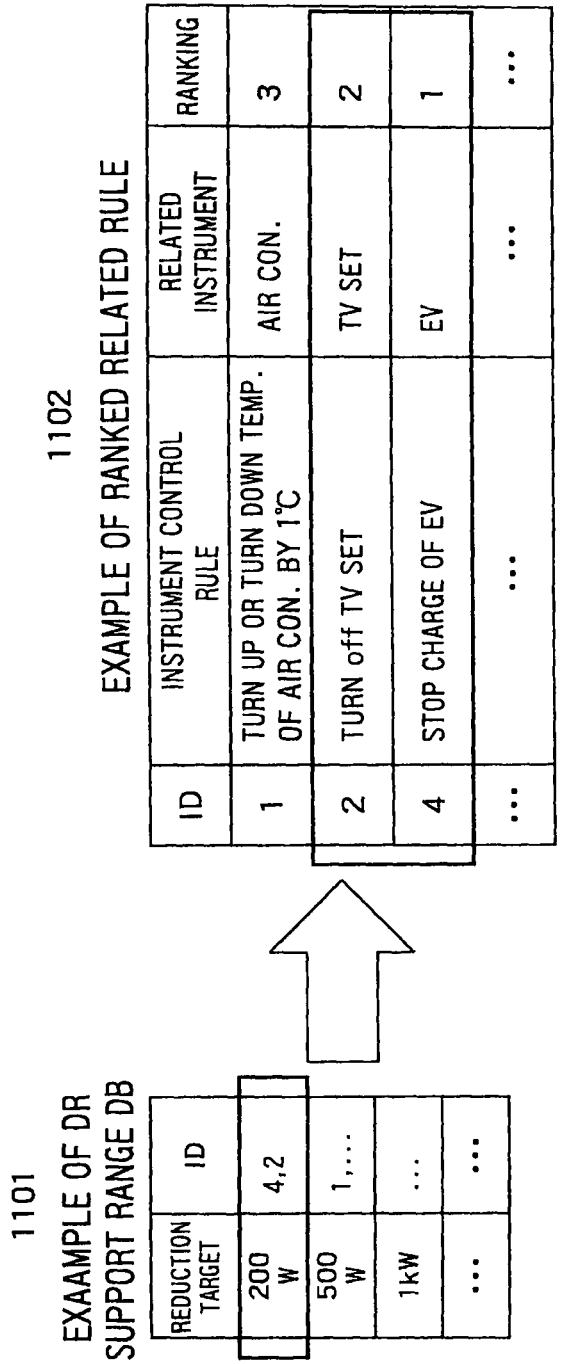
FIG. 11 illustrates an example of a processing procedure of a DR execution unit.

In Step S707, the DR execution unit 121 in FIG. 1 executes the processing. FIG. 11 illustrates an example of the processing. The instrument control rules 4 and 2 corresponding to the reduction target of 200 W of the DR notification are specified in the DR support range DB 1101, and the instruments (stop charge of EV and turn off TV set) related to the instrument control rules 4 and 2 are controlled. After a period of the DR execution, the customer may be asked to check whether the instrument is returned to the pre-control state. The instrument is returned to the pre-control state when the customer answers in the affirmative, and the instrument is maintained in the state at the end of the period of the DR execution when the customer answers in the negative.

In Step S708, the rule ranking history unit 123 in FIG. 1 executes the processing.

Figure 12:
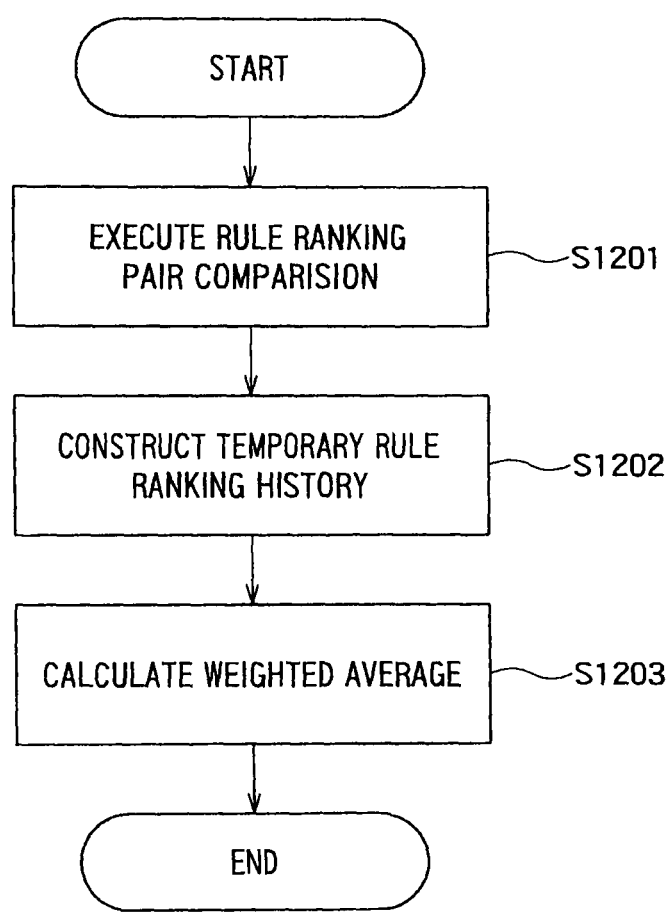
FIG. 12 illustrates an example of a processing procedure of a rule ranking history unit.

FIG. 12 illustrates an example of a processing procedure of the rule ranking history unit 123 in FIG. 1.

When Step S208 in FIG. 2 is executed, Step S1201 in FIG. 12 is executed.

In Step S1201, pair comparison is executed among the instrument control rules based on the ranking of the ranked related rules. The following combinations are conceivable as the pair comparison. That is, (A) all the combinations of the instrument control rules, (B) all the combinations of the instrument control rules that are executed in response to the DR notification, and (C) all the combinations among sets of a DR execution rule and a DR non-execution rule.

Figure 13:
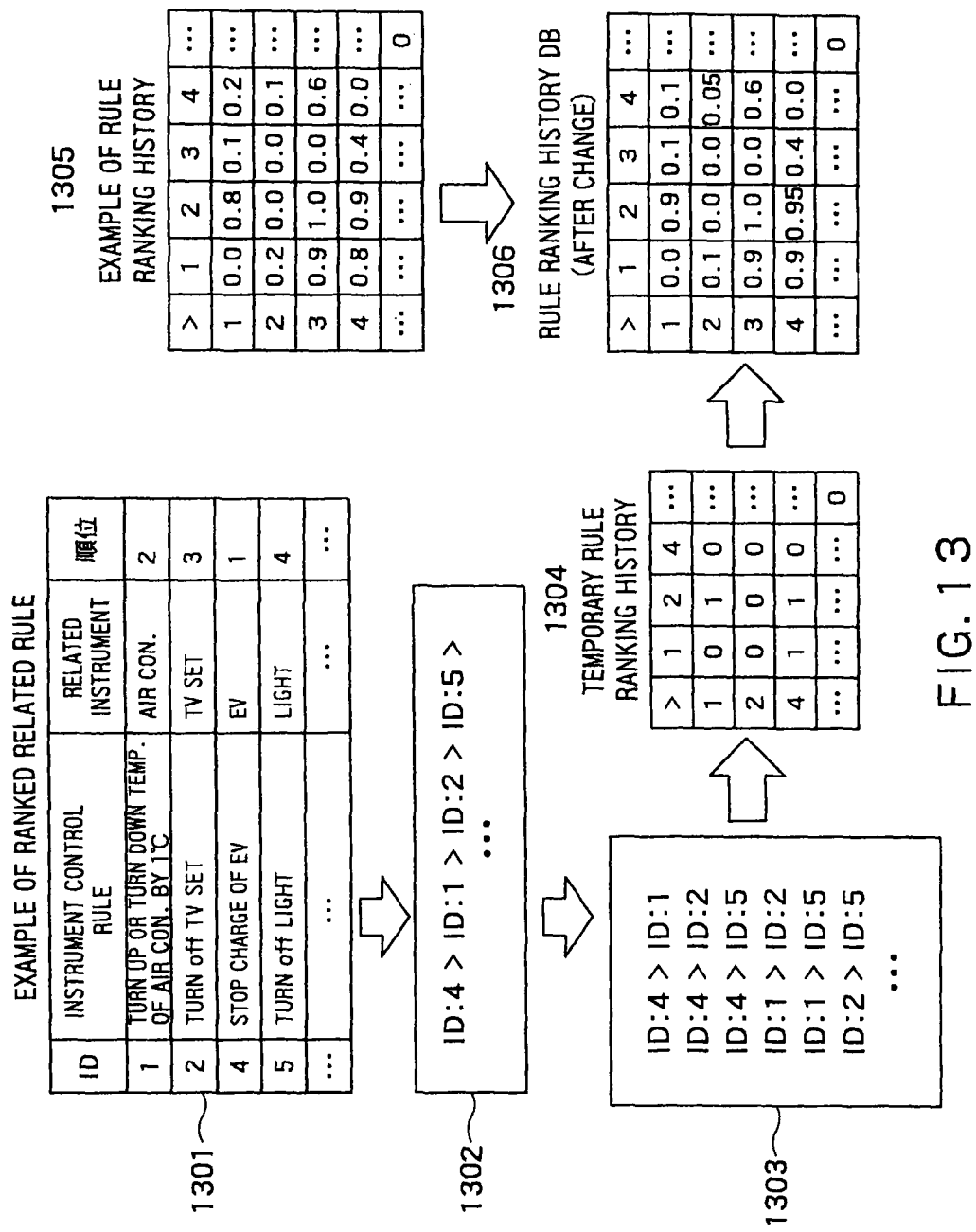
FIG. 13 illustrates an example of pair comparison.
Figure 14:
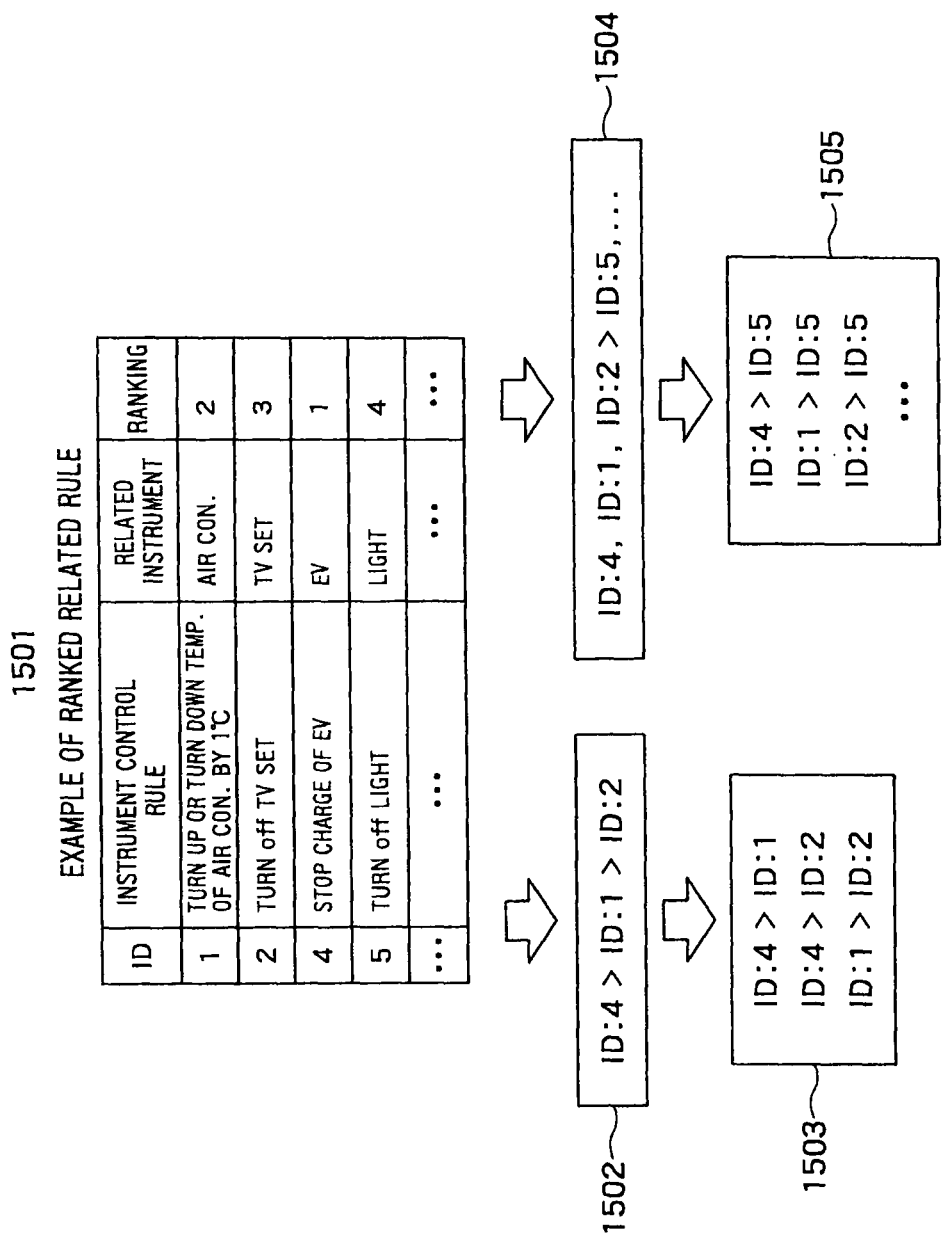
FIG. 14 illustrates another example of the pair comparison.

In an example in FIG. 13, the rules 1301 are arrayed according to a ranking 1302, and decomposed into a set 1303 of the pair comparison. The example in FIG. 13 corresponds to the case (A). FIG. 14 illustrates examples of the cases (B) and (C) of the pair comparison in an example 1501 of the ranked related rules. In the case (B), as illustrated in the numerals 1502 and 1503, the pair comparison is executed except the rule (such as ID 3) that is not executed in response to the DR notification. In the case (C), as illustrated in the numerals 1504 and 1505, the pair comparison is executed between the rules (ID 4, ID 1, and ID 2) that are executed in response to the DR notification and the rule (ID 5) that is not executed in response to the DR notification.

In Step S1202, the temporary rule ranking history is constructed from the set of pair comparison. In an example 1304 of the temporary rule ranking history in FIG. 13, because the rule of ID 4 is higher than the rule of ID 1 in the ranking, an element (ID:4, ID:1) of the temporary rule ranking history 1304 is set to 1, and an element (ID:1, ID:4) is set to 0. That is, the value having the higher ranking is set to 1, and the value having the lower ranking is set to 0. It is said that the temporary rule ranking history reflects the sequence newly selected by the customer.

In Step S1203, the temporary rule ranking history is weighted using the rule ranking update weight 122 to update the rule ranking history DB 114 in FIG. 1. In the example in FIG. 13, the post-update rule ranking history DB 1306 is calculated by calculating a weighted average of the values of the rule pairs included in the temporary rule ranking history 1304 and the values in the pre-change rule ranking history, respectively by each weight 0.5. For example, for an element (ID:1, ID:2), because the temporary rule ranking history has the value of 1 and the pre-change value of 0.8, the post-change value becomes (1+0.8)×0.5=0.9. Similarly, for an element (ID:2, ID:1), because the temporary rule ranking history has the value of 0 and the pre-change value of 0.2, the post-change value becomes (0+0.2)×0.5=0.1.

As described above, according to the first embodiment, the DR having high acceptability can easily be implemented by automatically learning the instrument control rule permitted by the customer. The instrument control reflecting a user's preference can be executed to reduce the power consumption while the power consumption reduction request is satisfied.

Figure 15:
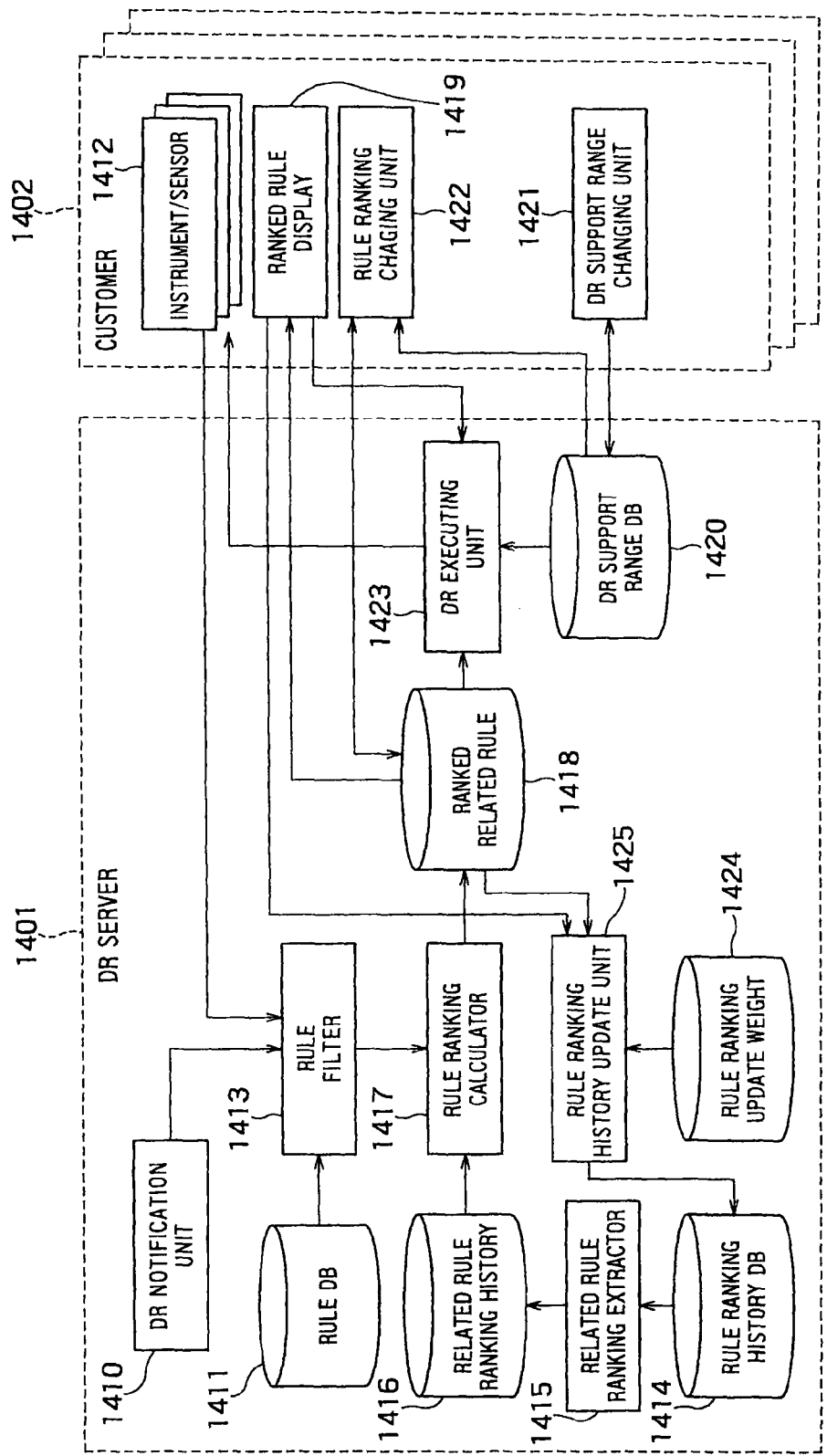
FIG. 15 illustrates a DR countermeasure proposal device according to a second embodiment.

FIG. 15 illustrates a DR countermeasure proposal device according to a second embodiment.

In a configuration of the second embodiment, a majority of the DR countermeasure proposal processing is executed in a DR server 1401, while an instrument/sensor 1412, a ranked rule display 1419 that is of the user interface, a rule ranking changing unit 1422, and a DR support range update unit 1421 are left in a customer 1402. A DR server 1401 is connected to the DR countermeasure proposal devices 1402 of plural houses of the customers.

The DR countermeasure proposal device 1402 in each house of the customer includes an instrument/sensor 1412, a ranked rule display 1419, a rule ranking changing unit 1422, and a DR support range update unit 1421.

The DR server 1401 includes a DR notification unit 1410, a rule database (DB) 1411, a rule filter 1413, a rule ranking history DB 1414, a rule ranking calculator 1417, a ranked related rule 1418, a DR support range DB 1420, a DR execution unit 1423, a rule ranking update weight 1424, a rule ranking history update unit 1425, a related ranking history extractor 1415, and a related rule ranking history 1416. Only a difference with the first embodiment is described below, and other descriptions are omitted.

The rule ranking histories DB 1414 of many customers are accumulated in the DR server 1401.

The DR server 1401 transmits the instrument control rules extracted by the rule filter 1413 to the terminal of the customer along with the ranking calculated by the rule ranking calculator 1417. The DR server 1401 reads DR support range information corresponding to the power consumption reduction request issued by the DR notification unit 1410 from the DR support range DB 1420, and transmits the DR support range information to the terminal of the customer. The power consumption reduction request may be issued in each customer or commonly be issued in all the customers.

The DR server 1401 changes the ranking of the instrument control rules in response to the request from the terminal of the customer. The DR server 1401 changes the DR support range information in response to the request from the terminal of the customer.

In addition to the rule ranking history of each customer, the rule ranking history extractor 1415 obtains the related rule ranking history 1416 in consideration of information on customers whose rule ranking histories are close to each other. Specifically, the rule ranking history extractor 1415 calculates a degree of similarity of the rule ranking history of each customer, and obtains the related rule ranking history 1416 by combining the rule ranking histories having a certain level of the degree of similarity.

A method (a correlation coefficient method in collaborative filtering) for calculating a correlation coefficient by regarding all the elements of the rule ranking history (matrix) as vectors can be cited as an example of the method for calculating the degree of similarity. It is determined that the degree of similarity is enhanced with increasing correlation coefficient. Examples of the rule ranking history combining method include a method for calculating a simple average of the similar rule ranking histories and a method for calculating a weighted average according to weights of the degrees of similarity (correlation coefficients).

Similarly to the first embodiment, the rule ranking calculator 1417 calculates the rule ranking using the related rule ranking history corresponding to the customer.

Because the operations of the DR server 1401 and other units are identical to those of the first embodiment, the detailed description is omitted. Similarly, because the units in the DR countermeasure proposal device are identical to those of the first embodiment, the detailed description is omitted.

As described above, according to the second embodiment, the DR having high acceptability can be implemented using the information on the similar customer only by selecting the instrument control rule permitted by the customer.

Figure 17:
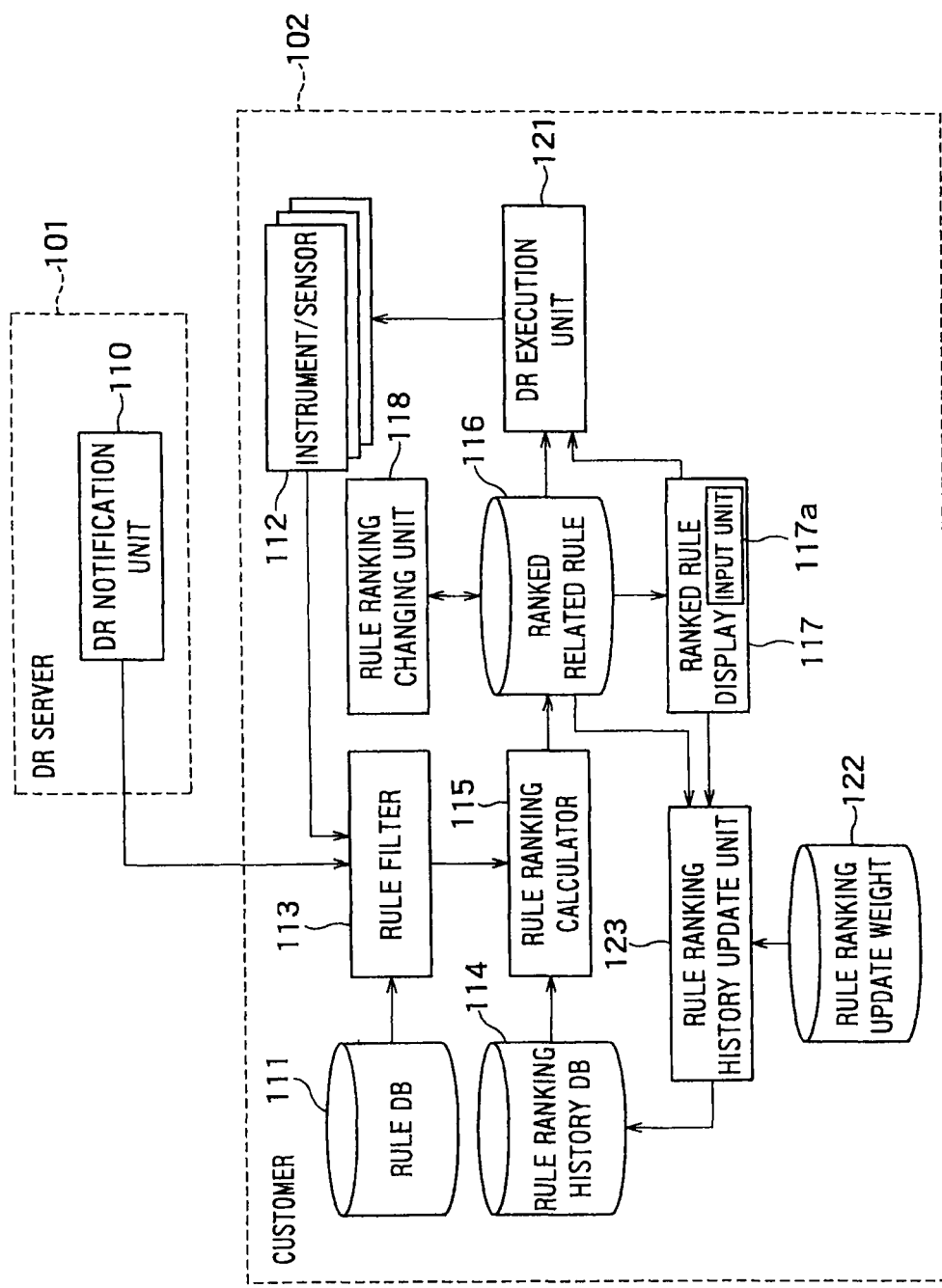
FIG. 17 illustrates a DR countermeasure proposal device according to a third embodiment.

FIG. 17 illustrates a DR countermeasure proposal device according to a third embodiment.

In the third embodiment, the processing of the DR support range DB and the processing of the DR support range update unit are eliminated in the DR countermeasure proposal processing of the first embodiment. A ranked rule display 1617 displays the instrument control rules related to the instruments in the house in the descending order. The ranked rule display 1617 selects the instrument control rules in the descending order of the ranking until the reduction target is satisfied, determines how many instrument control rules are executed to achieve the reduction target, and determines the instrument control rules necessary for the achievement as the execution target rule. Information distinguishing between the execution target rule and other instrument control rules (which ranks below the execution target rule) is displayed (for example, color coding or a boundary line). A function of specifying the execution target rule may be included in the DR execution unit 1621 or another unit.

The DR execution unit 1621 executes the execution target rules. In the case of the plural execution target rules, the execution target rules may be executed in the descending order, simultaneously be executed, or randomly be executed.

Through the above operations, it is not necessary for the user to input the DR support range.

Figure 18:
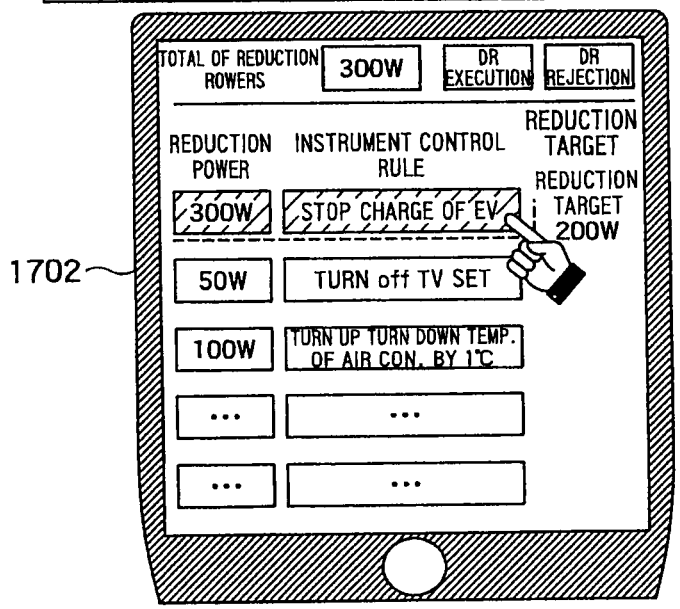
FIG. 18 illustrates an example of a screen of the third embodiment.

FIG. 18 illustrates a screen example in the case that the input of the DR support range does not exist. In this case, the reduction target is set to 200 W. Because the reduction target is satisfied only by the instrument control rule of stop charge of EV having the reduction power of 300 W, the instrument control rules except the instrument control rule of stop charge of EV are not used as the execution target rule. Because the operations of other units are identical to those of the first and second embodiments, the description is omitted.

Similarly, in the second embodiment (FIG. 15), the processing of the DR support range DB and the processing of the DR support range update unit can also be eliminated. In this case, the DR server transmits the instrument control rule and the ranking information on the instrument control rule to the terminal of the customer. In response to the request from the terminal of the customer, the DR server changes the ranking of the instrument control rule in the rule ranking history database. The DR server selects the instrument control rule from the instrument control rules in descending order of ranking for each customer such that the power consumption reduction request is satisfied by execution thereof, and controls the operation of the instrument in the house of the customer by executing the selected instrument control rule.

As described above, according to the third embodiment, the DR can be executed even if the user does not input the DR support range.

The invention claimed is:

1. A DR (Demand Response) countermeasure proposal device comprising:
  a communication unit to receive a power consumption reduction request indicating power consumption to be reduced or to be targeted from a DR (Demand Response) server;
  a rule database configured to store a plurality of instrument control rules related to a plurality of instruments of a customer;
  a rule ranking history database configured to store information on a ranking of the instrument control rules;
  a display configured to display on one display the instrument control rules related to the instruments in the rule database according to the ranking of the instrument control rules;
  a rule ranking changing unit configured to change the ranking of the instrument control rules which are displayed on the one display in response to an instruction input related to specifying the instrument control rules from the customer;
  a DR execution unit configured to select at least one instrument control rule by execution of which the power consumption reduction request is satisfied in descending order of the ranking of the instrument control rules, and execute the at least one instrument control rule to control operation of at least one instrument related to the at least one instrument control rule;

a DR support range database configured to store DR support range information assigning a range of an instrument control rule to be executed for each value of power consumption to be reduced or to be targeted; and a DR support range update unit, wherein the display displays the DR support range information corresponding to the power consumption reduction request received by the communication unit, the DR support range update unit changes the DR support range information in response to an instruction input from the customer, and the DR execution unit executes the instrument control rule assigned by the DR support range information.

2. The device according to claim 1, further comprising a rule ranking calculator, wherein the rule ranking history database stores, as the information on the ranking of the instrument control rules, a rule ranking probability for each instrument control rule pair, respectively, the rule ranking probability being a probability that ranking of one of the instrument control rule pair is higher than that of the other, and the rule ranking calculator calculates a maximum eigenvector of a matrix including the rule ranking probability for each instrument control rule pair, and calculates the ranking of the instrument control rules based on value of elements of the maximum eigenvector.

3. The device according to claim 2, comprising a rule ranking history update unit configured to produce a temporary rule ranking history indicating a probability that the ranking of one of the instrument control rule pair is higher than that of the other based on the ranking changed by the rule ranking changing unit, and update the rule ranking history database according to the temporary rule ranking history.

4. The device according to claim 3, wherein the rule ranking history update unit updates, for each instrument control rule pair, the rule ranking probability by calculating a weighted average of the probability indicated by the temporary rule ranking history and the rule ranking probability.

5. The device according to claim 4, wherein instrument control rule pairs that becomes an update target of the rule ranking probability are all combinations of each two of the instrument control rules related to the instruments of the customer.

6. The device according to claim 1, further comprising a rule ranking calculator and a rule ranking history update unit, wherein the rule ranking history database stores, as the information on the ranking of the instrument control rules, a rule ranking probability for each instrument control rule pair, respectively, the rule ranking probability being a probability that ranking of one of the instrument control rule pair is higher than that of the other, the rule ranking calculator calculates a maximum eigenvector of a matrix including the rule ranking probability for each instrument control rule pair, and calculates the ranking of the instrument control rules based on values of elements of the maximum eigenvector, the rule ranking history update unit produces a temporary rule ranking history indicating a probability that the ranking of one of the instrument control rule pair is higher than that of the other based on the ranking changed by the rule ranking changing unit, and updates, for each instrument control rule pair, the rule ranking probability by calculating a weighted average of the probability indicated by the temporary rule ranking history and the rule ranking probability, and instrument control rule pairs that become an update target of a rule ranking probability is all combinations of two instrument control rules between a set of the instrument control rules assigned by the DR support range information and a set of instrument control rules that is not assigned by the DR support range information among the instrument control rules in the rule database, or all combinations of each two of the instrument control rules assigned by the DR support range information.

7. The device according to claim 1, further comprising a rule filter configured to specify instruments in an operating state among the instruments of the customer, and extract instrument control rules related to specified instruments, wherein the display and the DR execution unit targets only the instrument control rules extracted by the rule filter.

8. The device according to claim 1, wherein the display displays the instrument control rules such that an instrument control rule of a higher ranking is displayed on an upper side of a screen.

9. The device according to claim 1, wherein the DR execution unit configured to execute the selected instrument control rule only when an input to accept execution of the at least one instrument control rule is obtained from the customer.

10. A DR server which comprises at least one processor, the DR server comprising:

a DR notification unit configured to issue a power consumption reduction request indicating power consumption to be reduced or to be targeted;

a rule database configured to store instrument control rules related to a plurality of instruments existing for each of customers; and a rule ranking history database configured to store information on a ranking of the instrument control rules for each of the customers, wherein the DR server transmits, for each of the customers, the instrument control rules and the information on the ranking of the instrument control rules to a terminal of each of the customers, wherein the terminal is configured to display on one display the instrument control rules related to the instruments and the information on the ranking of the instrument control rules, and to receive an instruction input related to the instrument control rules which are displayed on the one display from the customer, the DR server changes, in response to a request specifying the instrument control rules from the terminal of each of the customers, the ranking of the instrument control rules in the rule ranking history database, and the DR server selects, for each of the customers, at least one instrument control rule by execution of which the power consumption reduction request is satisfied in descending order of the ranking from the instrument control rules, and executes the at least one instrument control rule to control operation of at least one instrument related to the at least one instrument control rule, the DR server further comprising a DR support range database configured to store DR support range information assigning a range of an instrument control rule to be executed for each value of power consumption to be reduced or to be targeted, for each of the customers, the DR server transmits, for each of the customers, the DR support range information corresponding to the power consumption reduction request as issued, the DR server changes the DR support range information in response to a request specifying the DR support range information from the terminal of each of the customers, and the DR server executes the instrument control rule assigned by the DR support range information for each of the customers.

11. The DR server according to claim 10, further comprising a rule ranking calculator and a related ranking history extractor, wherein the rule ranking history database stores, as the information on the ranking of the instrument control rules, a rule ranking probability for each instrument control rule pair, respectively, the rule ranking probability being a probability that ranking of one of the instrument control rule pair is higher than that of the other, and the rule ranking calculator calculates a maximum eigenvector of a matrix including the rule ranking probability for each instrument control rule pair, and calculates the ranking of the instrument control rules based on value of elements of the maximum eigenvector, the related ranking history extractor calculates a correlation coefficient between each of the rule ranking history databases, respectively, and based on each correlation coefficient, rule ranking history databases being similar to each other are combined to obtain a related rule ranking history, the rule ranking calculator calculates the ranking of the instrument control rules based on the related rule ranking history for customers for which the rule ranking history databases are combined.

12. The DR server according to claim 11, wherein the related ranking history extractor calculates a simple average among the rule ranking history databases being similar to each other or a weighted average according to the correlation coefficients thereof.

13. A DR (Demand Response) countermeasure proposal method comprising:

receiving a power consumption reduction request indicating power consumption to be reduced or to be targeted from a DR (Demand Response) server;

accessing a rule database configured to store a plurality of instrument control rules related to a plurality of instruments of a customer;

accessing a rule ranking history database configured to store information on a ranking of the instrument control rules;

displaying on one display the instrument control rules related to the instruments in the rule database according to the ranking of the instrument control rules;

changing the ranking of the instrument control rules which are displayed on the one display in response to an instruction input specifying the instrument control rules from the customer;

selecting at least one instrument control rule by execution of which the power consumption reduction request is satisfied in descending order of the ranking from the instrument control rules, and executing the at least one instrument control rule to control operation of corresponding at least one instrument;

displaying, based on a DR support range database configured to store DR support range information assigning a range of an instrument control rule to be executed for each value of power consumption to be reduced or to be targeted, the DR support range information corresponding to the power consumption reduction request as received; and changing the DR support range information in response to an instruction input from the customer, and said executing the at least one instrument control rule includes executing the instrument control rule assigned by the DR support range information.

* * * * *